United States Patent
Sela et al.

(10) Patent No.: US 11,836,374 B1
(45) Date of Patent: Dec. 5, 2023

(54) STORAGE SYSTEM AND METHOD FOR DATA PLACEMENT IN ZONED STORAGE

(71) Applicant: Western Digital Technologies, Inc., San Jose, CA (US)

(72) Inventors: Rotem Sela, Haifa (IL); Einav Zilberstein, Had Hasharon (IL); Asher Druck, Balfor (IL)

(73) Assignee: Western Digital Technologies, Inc., San Jose, CA (US)

( * ) Notice: Subject to any disclaimer, the term of this patent is extended or adjusted under 35 U.S.C. 154(b) by 3 days.

(21) Appl. No.: 17/860,548

(22) Filed: Jul. 8, 2022

Related U.S. Application Data

(60) Provisional application No. 63/347,118, filed on May 31, 2022.

(51) Int. Cl.
*G06F 3/06* (2006.01)

(52) U.S. Cl.
CPC ............ *G06F 3/0652* (2013.01); *G06F 3/061* (2013.01); *G06F 3/0619* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,560,801 | B1* | 10/2013 | Pendharkar | G06F 3/061 711/158 |
| 2017/0242583 | A1* | 8/2017 | Yang | G06F 3/0679 |
| 2022/0156008 | A1* | 5/2022 | Lee | G06F 12/0246 |
| 2022/0244869 | A1* | 8/2022 | Kanteti | G06F 3/0631 |
| 2022/0334746 | A1* | 10/2022 | Cho | G06F 12/0246 |
| 2022/0398201 | A1* | 12/2022 | Goto | G06F 3/061 |
| 2023/0088291 | A1* | 3/2023 | Tsuji | G06F 3/0604 711/154 |
| 2023/0273865 | A1* | 8/2023 | Fay | G06F 11/1453 707/679 |

OTHER PUBLICATIONS

"Zoned Storage Devices"; Introduction Overview—Zoned Storage Documentation; downloaded from the Internet at https://zonedstorage.io/docs/introduction/zoned-storage on Jul. 8, 2022; Western Digital Corporation, 2022; 4 pages.
"NVMe Zoned Namespaces (ZNS) SSDs"; Introduction—Zoned Storage Documentation; downloaded from the Internet at https://zonedstorage.io/docs/introduction/zns on Jul. 8, 2022; Western Digital Corporation, 2022; 9 Pages.

* cited by examiner

*Primary Examiner* — Kevin Verbrugge
(74) *Attorney, Agent, or Firm* — Crowell & Moring LLP

(57) ABSTRACT

A storage system uses blocks of memory that are sized larger than a size of a zone. This means that the storage system stores multiple zones in a given block. Storing zones with different zone properties in a given block can be problematic, so the storage system obtains zone property information for each zone and stores zones with similar zone properties in a given block.

20 Claims, 8 Drawing Sheets

STORAGE SYSTEM AND METHOD FOR DATA PLACEMENT IN ZONED STORAGE

CROSS-REFERENCE TO RELATED APPLICATION

This application claims priority to U.S. Provisional Patent Application No. 63/347,118, which is hereby incorporated by reference.

BACKGROUND

A host and storage system can operate under a standard that provides the use of zones. Each zone provides a logical block address (LBA) range that must be written sequentially and must be erased/reset before it can be written into again. Such zones reduce write amplification, overprovisioning, and internal controller memory usage, while improving throughput and latency. The host manages the creation and use of zones, and the storage system can have parallel input/output (I/O) queues to handle reads and writes into the zones. Different applications on the host can direct I/Os to different zones.

DETAILED DESCRIPTION

The following embodiments generally relate to a storage system and method for data placement in zoned storage. In one embodiment, a storage system is provided comprising a memory comprising a plurality of blocks and a controller. The controller is configured to obtain a zone property of each of a plurality of zones, and determine which of the plurality of blocks to store each of the plurality of zones based on the zone property of each zone. In another embodiment, a method is provided comprising obtaining zone characteristics of a plurality of zones, determining which of the plurality of blocks to store each of the plurality of zones based on the zone characteristics, and storing multiple zones having similar zone characteristics in a single block. In another embodiment, a storage system is provided comprising a memory comprising a plurality of blocks, means for obtaining a zone property of each of a plurality of zones, and means for determining which of the plurality of blocks to store each of the plurality of zones based on the zone property of each zone. Other embodiments are provided and can be used alone or in combination.

Figure 1A:
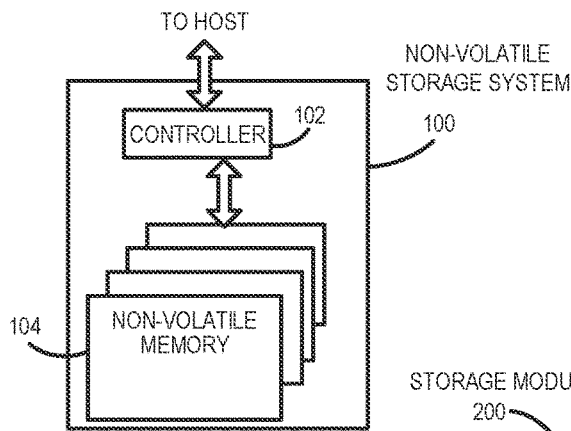
FIG. 1A is a block diagram of a non-volatile storage system of an embodiment.
Figure 1B:
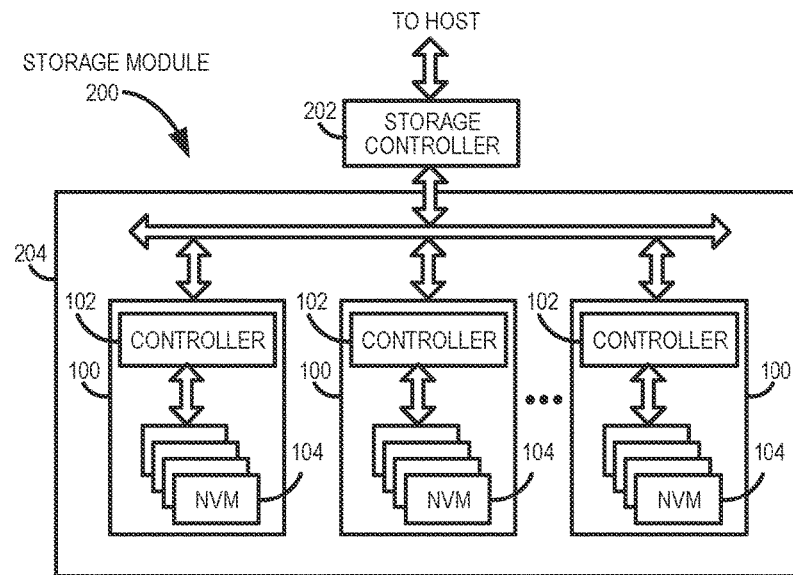
FIG. 1B is a block diagram illustrating a storage module of an embodiment.
Figure 1C:
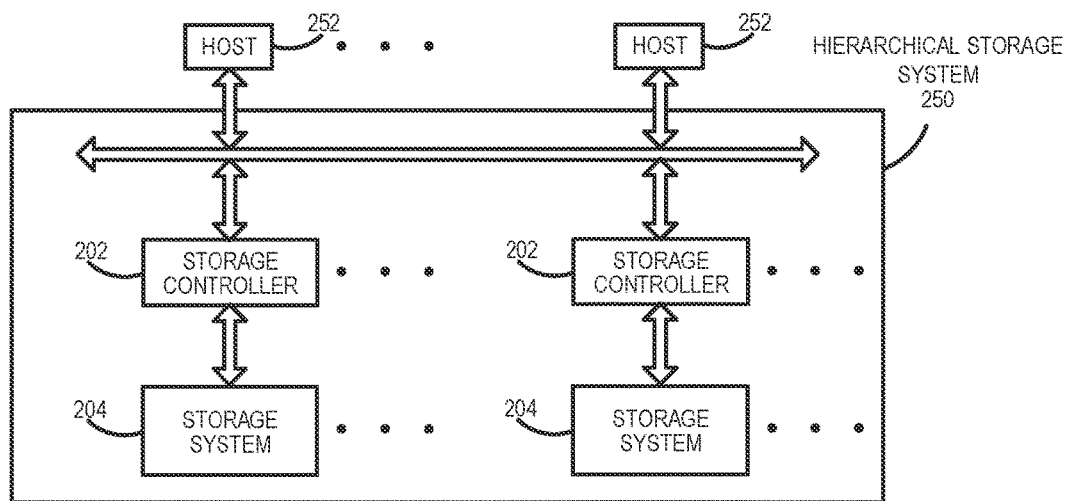
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 (sometimes referred to herein as a data storage device) includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may he a non-volatile memory controller (e.g., a flash, resistive random-access memory ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
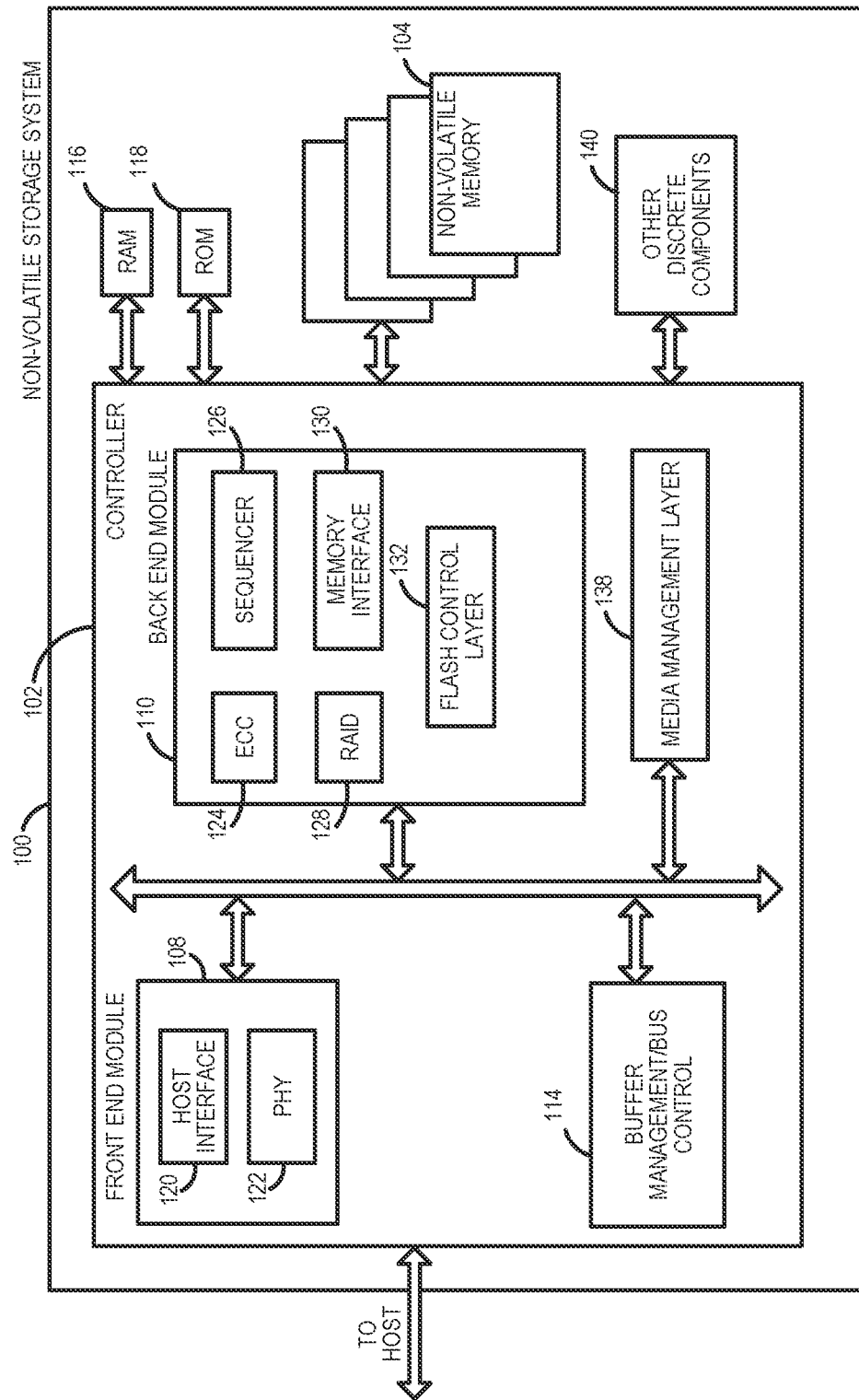
FIG. 2A is a block diagram illustrating components of the controller of the nonvolatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Dives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Figure 2B:
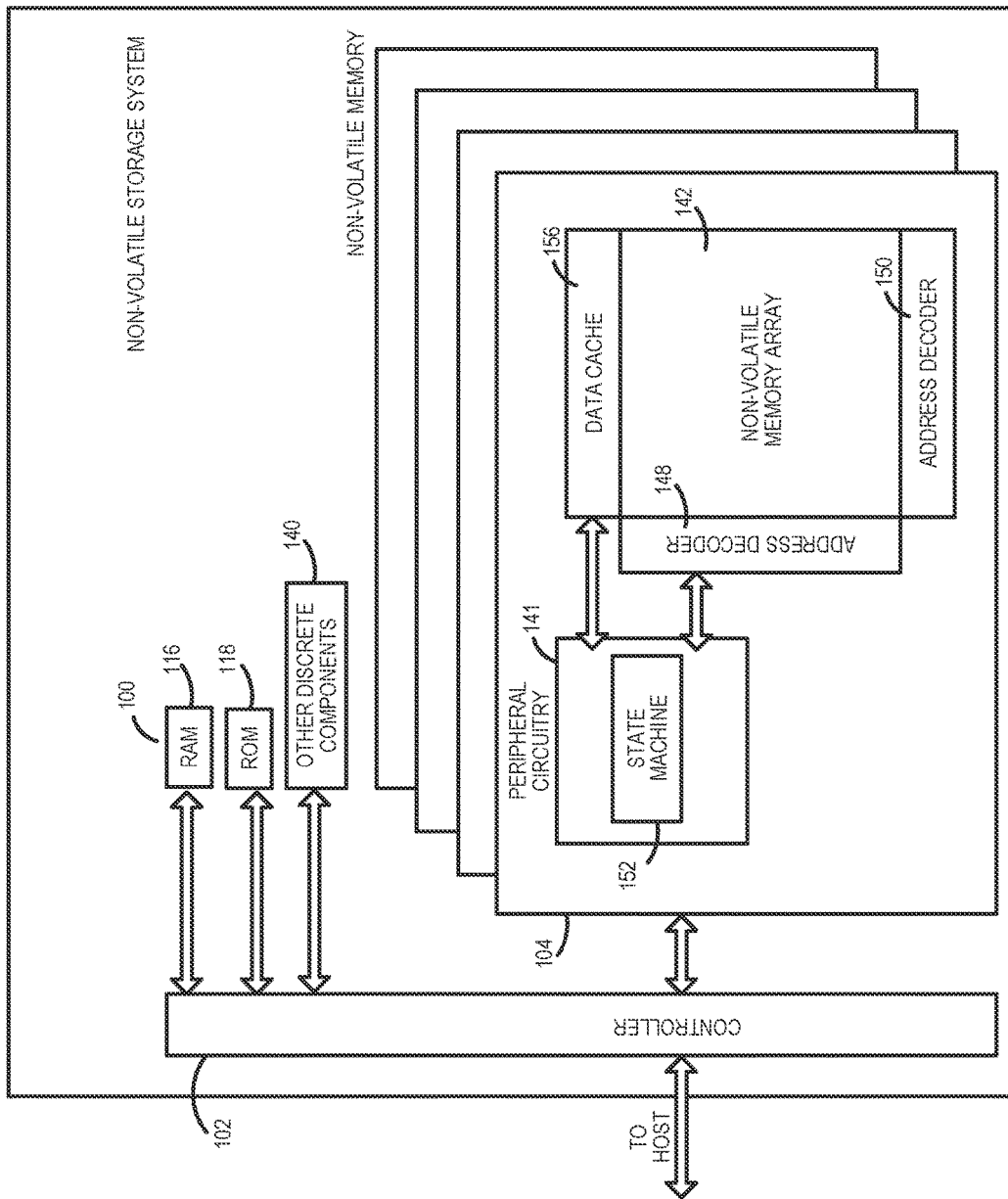
FIG. 2B is a block diagram illustrating components of the non-volatile storage system illustrated in FIG. 1A according to an embodiment.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102, FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data.

The non-volatile memory cells may be any suitable non-volatile memory cells, including ReRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
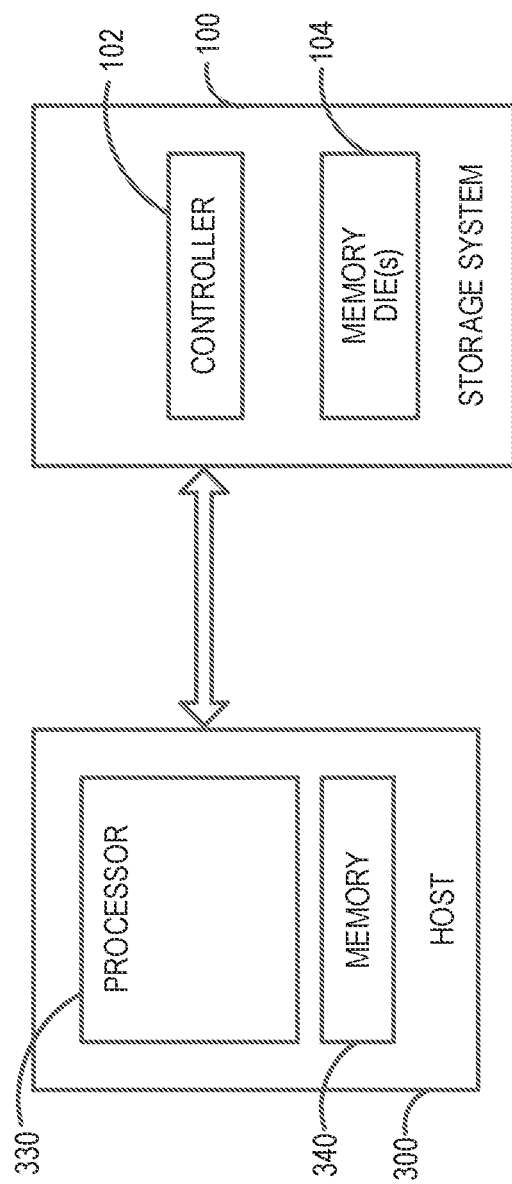
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

The following embodiments related to jumbo blocks and zones. A "jumbo block" refers to a block of memory cells that spans multiple memory dies and planes. A jumbo block can contain, for example, hundreds of megabytes or one gigabyte of data. (While jumbo blocks are used in this example, it should be understood that these embodiments can be used with blocks other than jumbo blocks (e.g., blocks that do not span dies or planes).) A "zone" is a logical block address range in the memory 104 that is written sequentially (a write pointer can keep track of the position of the next write), cannot be directly overwritten (i.e., the entire zone must be erased), and is managed by the host 300 (the host 300 aligns its writes to the sequential write requirement of the zone and manages garbage collection). The use of zones can reduce write amplification, overprovisioning, and internal controller memory usage, while improving throughput and latency.

Figure 4:
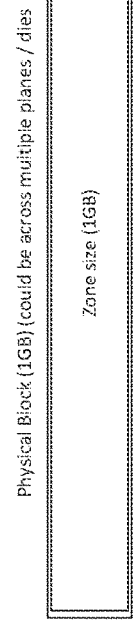
FIG. 4 is an illustration of an embodiment where a size of a zone matches a size of a block.
Figure 5:
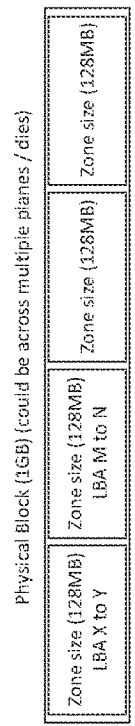
FIG. 5 is an illustration of a block of an embodiment comprising a plurality of zones.

As shown in FIG. 4, the size of a zone can be chosen to be the same size as the size of a jumbo block. However, because performing garbage collection on a large zone can have negative power and write-amplification implications, it may be preferred to size the zone to a smaller size (e.g., 128 MB instead of 1 GB). So, as shown in FIG. 5, a jumbo block can store a plurality of zones. Storing multiple zones in a single block can create issues though. For example, while the host 300 can ensure that the data temperature of all the data in a given zone is the same, the storage system 100 is not aware of the data temperature of a given zone because the host 300 is responsible for zone operations. (As used herein, "temperature" refers to the likelihood that data (or a zone) will be accessed, with "hot" designating "likely to be frequently accessed" and "cold" designating "unlikely to be frequently accessed.") That is, while the host 300 determines the zone temperature and places data with the relevant temperature in that zone, the storage system 100 does not take part in that decision. As such, the storage system 100 may place zones with different data temperatures in the same block. This may be undesirable, as the storage system 100 may prefer a block to have zones of similar data temperatures. For example, in some embodiment, during an erase operation, the entire block is erased. If zones within the block have different data temperatures, excessive garbage collection may be performed, which can have a negative impact on the endurance of the memory 104.

To address this issue, the storage system 100 can obtain zone temperature information (i.e., information on the temperature of the data stored in the zone) and use that zone temperature information to determine which block to place a zone. (A block can be an SIX block or an WC block.) In this way, these embodiments can interleave multiple zones in the same block based on temperature of the zone. Grouping zones with similar data temperatures in a block can provide performance and endurance benefits because invalidation and relocation of data from the block can be more efficient with less fragmentation and, hence, lower write amplification and performance reduction due to garbage collection operations.

The zone temperature information ("hint") can be obtain in any suitable way. (It should be understood that while zone/data temperature is used in this example, these embodiments can be used with other types of zone/data properties or characteristics, including, but not limited to, expected read pattern (random or sequential), expected lifetime of data, etc.) For example, the zone temperature information can be provided to the storage system 100 by the host 300 as part of a write command (e.g., using the GroupID field in the write command) or as part of an open zone command). Alternatively, the storage system 100 can obtain zone temperature information on its own. These various approaches are illustrated in FIGS. 6-8

Figure 6:
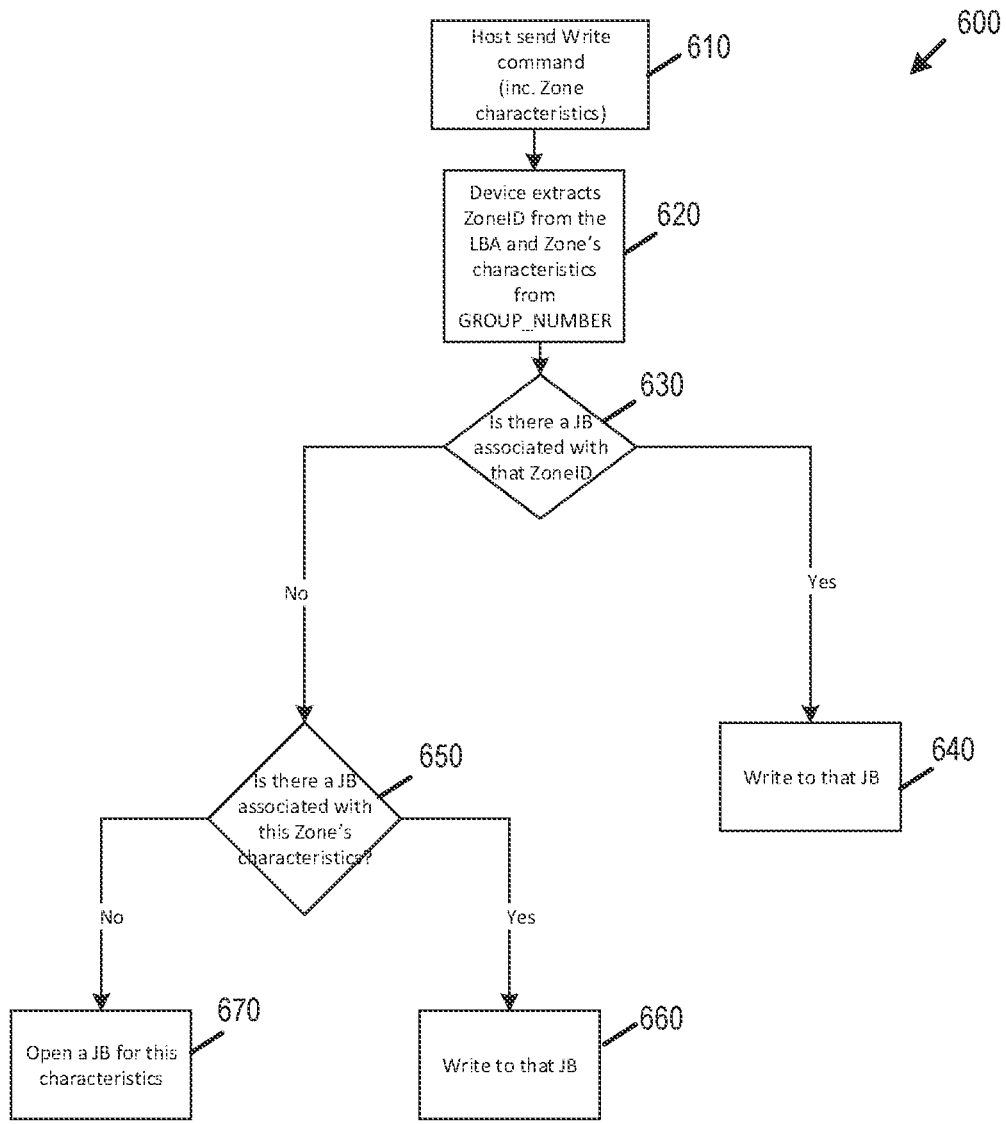
FIG. 6 is a flow chart of a write method of an embodiment.

As shown in the flow chart 600 in FIG. 6, in one embodiment, the host 300 sends a write command (including zone characteristics) to the data storage device 100 (act 610). The controller 102 of the data storage device 100 extracts the ZoneID from the logical block address (LBA) and the zone's characteristics from the GROUP_NUMBER field (act 620). The controller 102 then determines if there is a jumbo block (JB) associated with the ZoneID (act 630). If there is an open jumbo block, the controller 102 write the data to that open jumbo block (act 640). If there isn't an open jumbo block, the controller 102 determines if there is a jumbo block associated with the zone's characteristics (act 650). If there is, the controller 102 writes to that jumbo block (act 660). If there isn't, the controller 102 opens a jumbo block for that characteristic (act 670).

Figure 7:
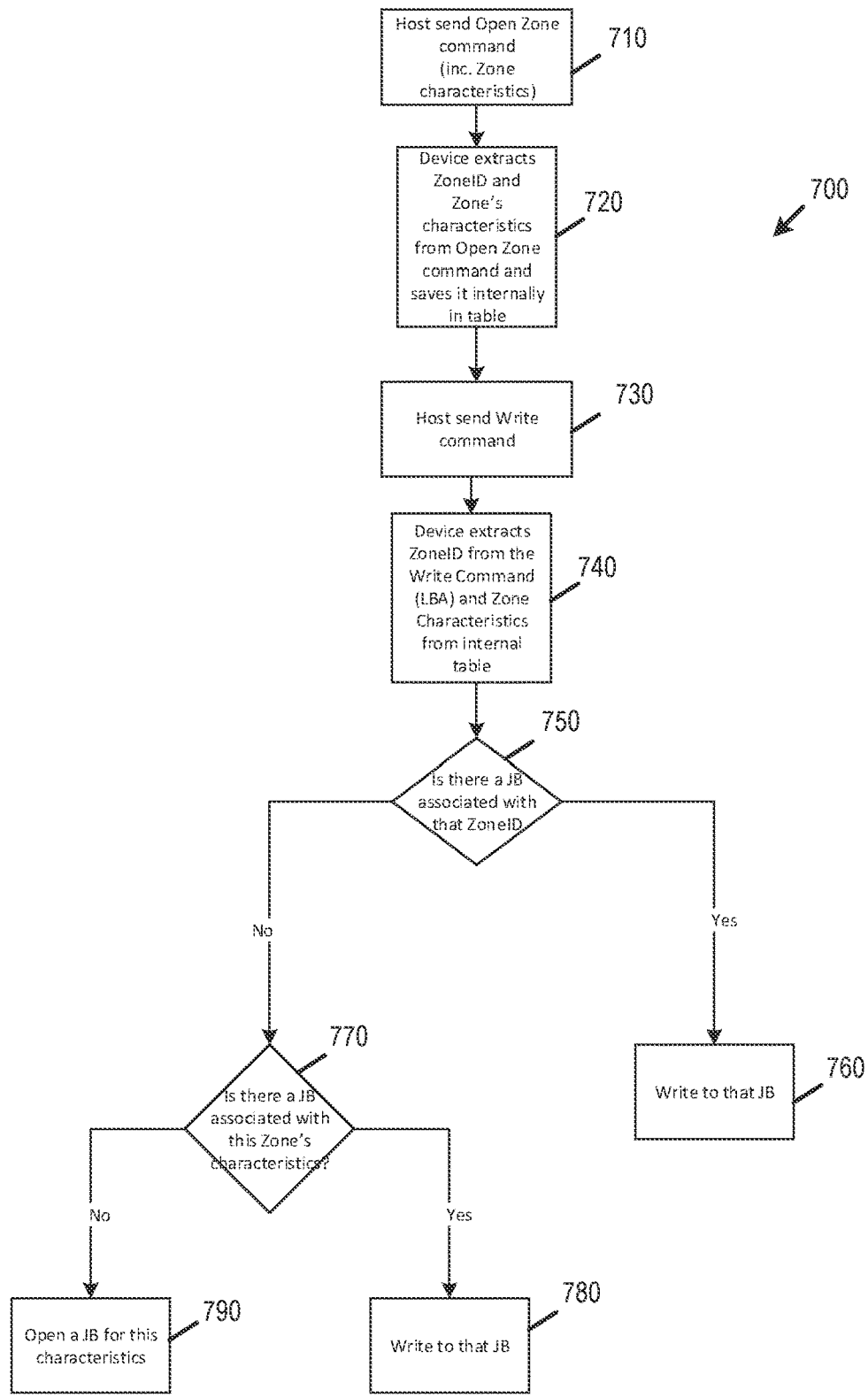
FIG. 7 is a flow chart illustrating the operation of an open zone command of an embodiment.

As shown in the flow chart 700 in FIG. 7, in one embodiment, the host 300 sends an open zone command (including zone characteristics) to the data storage device 100 (act 710). The controller 102 of the data storage device 100 extracts the ZoneID and the zone's characteristics from the open zone command and stores it internally in a table or other data structure (act 720). The host 300 then sends a write command to the data storage device 100 (act 730). The controller 102 of the data storage device 100 extracts the ZoneID from the logical block address (LBA) in the write command and the zone's characteristics from the internal table (act 740). Then, the controller 102 determines if there is a jumbo block (JB) associated with the ZoneID (act 750). If there is, the controller 102 write the data to that jumbo block (act 760). If there isn't, the controller 102 determines if there is a jumbo block associated with the zone's characteristics (act 770). If there is, the controller 102 writes to that jumbo block (act 780). If there isn't, the controller 102 opens a jumbo block for that characteristic (act 790).

Figure 8:
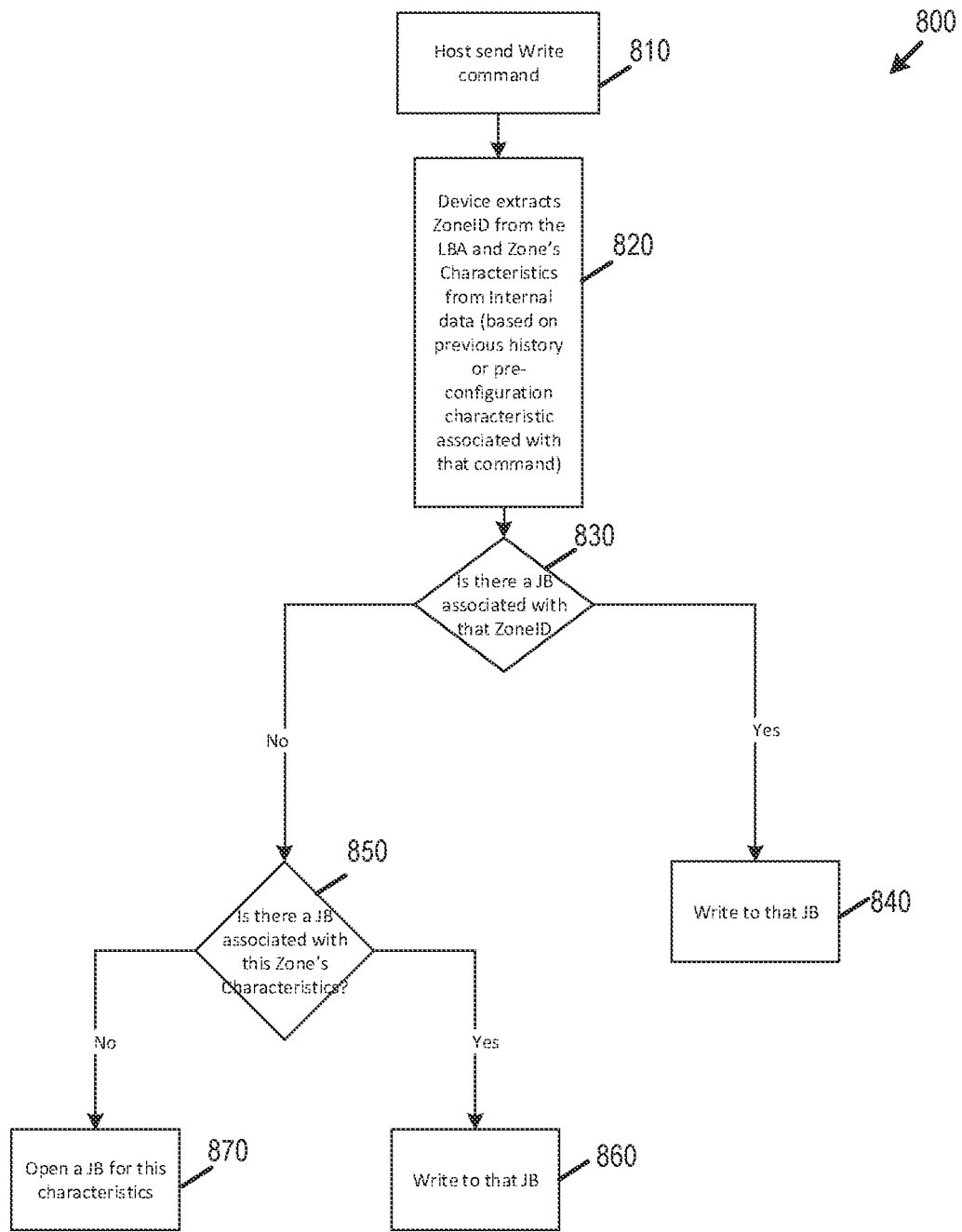
FIG. 8 is a flow chart of an autonomous identify operation of an embodiment.

As shown in the flow chart 800 in FIG. 8, in one embodiment, the host 300 sends a write command to the data storage device 100 (act 810). The controller 102 of the data storage device 100 extracts the ZoneID from the logical block address (LBA) in the write command and the zone's characteristics from internal data (e.g., based on previous history or a pre-configuration characteristic associated with that command) (act 820). The controller 102 then determines if there is a jumbo block (JB) associated with the ZoneID (act 830). If there is, the controller 102 write the data to that jumbo block (act 840). If there isn't, the controller 102 determines if there is a jumbo block associated with the zone's characteristics (act 850). If there is, the controller 102 writes to that jumbo block (act 860). If there isn't, the controller 102 opens a jumbo block for that characteristic (act 870).

Figure 9:
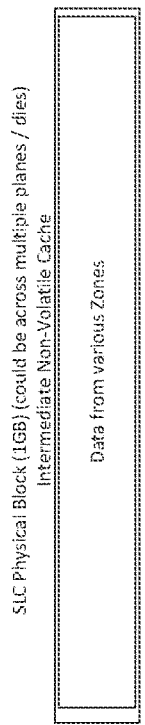
FIG. 9 is an illustration of a block of an embodiment.

There are many alternatives that can be used with these embodiments. example, as shown in FIG. 9, the controller 102 can write data first to an SLC block as part of a write booster for high write performance and later fold the data into an MIX jumbo block according to data temperature, such that zones with the same temperature are stored in the jumbo block. The write sent to SLC block can also be according to zone temperature.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged. as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
  a memory comprising a plurality of blocks; and
  a controller coupled with the memory and configured to:
    obtain a zone property of each of a plurality of zones;
    determine which of the plurality of blocks to store each of the plurality of zones based on the zone property of each zone; and
    perform a folding operation into one of the plurality of blocks.

2. The storage system of claim 1, wherein at least one of the blocks comprises a jumbo block that spans multiple dies or planes in the memory.

3. The storage system of claim 1, wherein the zone property comprises temperature.

4. The storage system of claim 1, wherein the zone property comprises an expected read pattern.

5. The storage system of claim 1, wherein the zone property comprises an expected lifetime of data.

6. The storage system of claim 1, wherein the zone properties are obtained from a host.

7. The storage system of claim 6, wherein the zone properties are obtained from a write command received from the host.

8. The storage system of claim 7, wherein the zone properties are obtained from a GroupID field in the write command.

9. The storage system of claim 6, wherein the zone properties are obtained from an open zone command received from the host.

10. The storage system of claim 1, wherein the zone properties are obtained by the controller from a history of previous commands received from a host.

11. The storage system of claim 1, wherein the zone properties are obtained by the controller from a pre-configuration characteristic associated with a command received from a host.

12. The storage system of claim 1, wherein the memory comprises a three-dimensional memory.

13. In a storage system comprising a memory comprising a plurality of blocks, a method comprising:
  obtaining zone characteristics of a plurality of zones;
  determining which of the plurality of blocks to store each of the plurality of zones based on the zone characteristics; and
  storing multiple zones having similar zone characteristics in a single block;
  wherein the zone characteristics are obtained from an open zone command received from a host.

14. The method of claim 13, wherein at least one of the blocks comprises a jumbo block that spans multiple dies.

15. The method of claim 13, wherein the zone characteristics comprise temperature.

16. The method of claim 13, wherein the zone characteristics are obtained from a write command received from a host.

17. The method of claim 13, wherein at least one of the blocks comprises a jumbo block that spans multiple planes in the memory.

18. The method of claim 13, wherein the zone characteristics comprise an expected read pattern.

19. The method of claim 13, wherein the zone characteristics comprise an expected lifetime of data.

20. A storage system comprising:
  a memory comprising a plurality of blocks;
  means for obtaining zone characteristics of a plurality of zones;
  means for determining which of the plurality of blocks to store each of the plurality of zones based on the zone characteristics; and
  means for storing multiple zones having similar zone characteristics in a single block;
  wherein the zone characteristics are obtained from a previous command history or a pre-configuration characteristic associated with a command.

* * * * *